W. J. PHELPS.
MEANS FOR SOLDERING THE END SEAMS OF CANS.
APPLICATION FILED MAY 22, 1908.
947,935.
Patented Feb. 1, 1910.
4 SHEETS—SHEET 1.
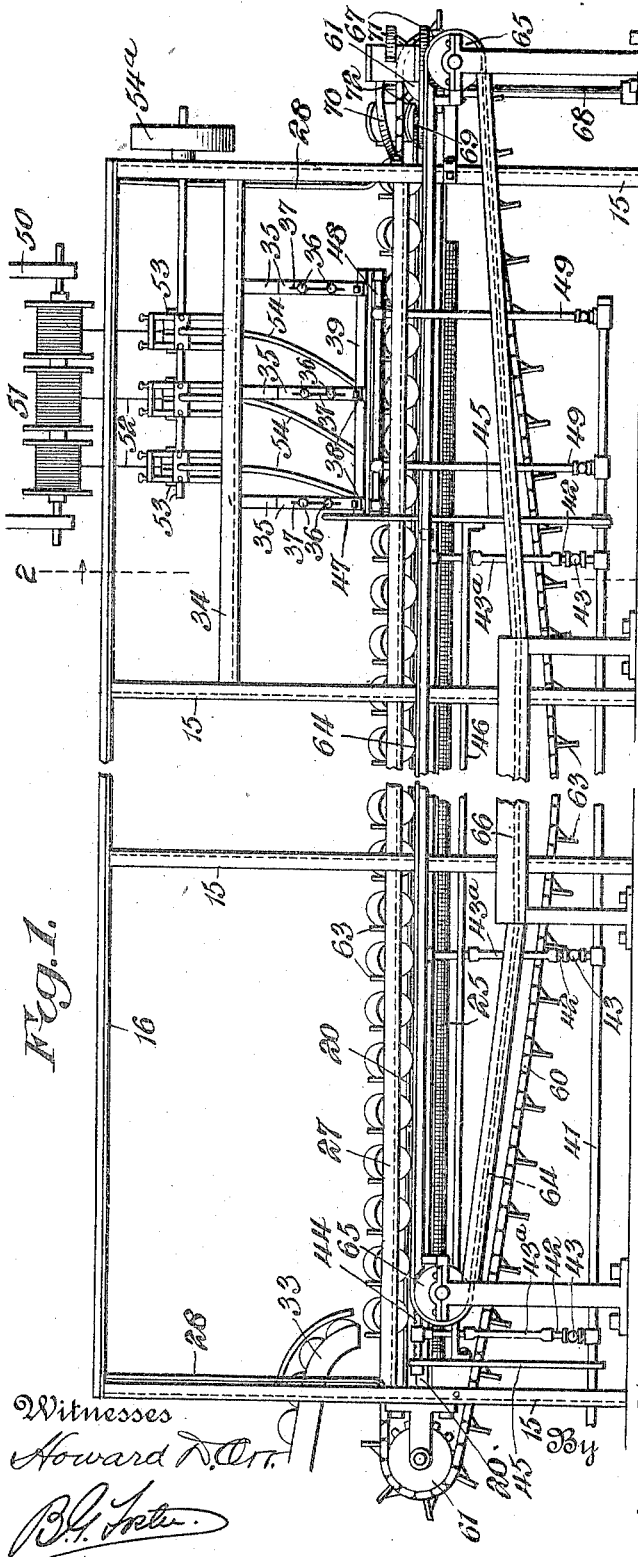
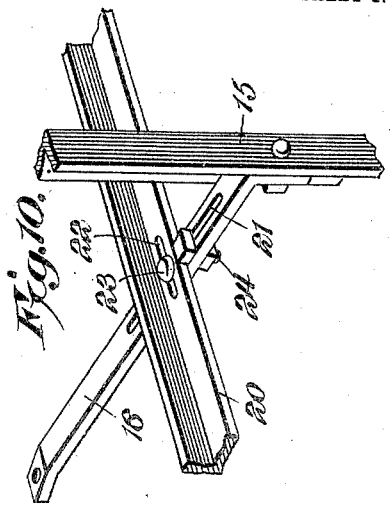
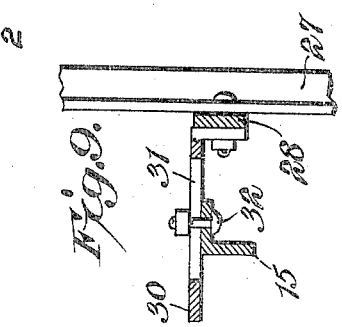
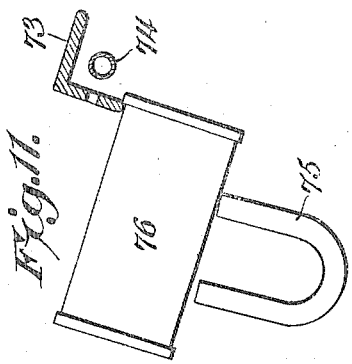
Witnesses
Howard D. Orr
B. G. Trete
Inventor,
Walter J. Phelps,
By
C. G. Siggers
Attorney

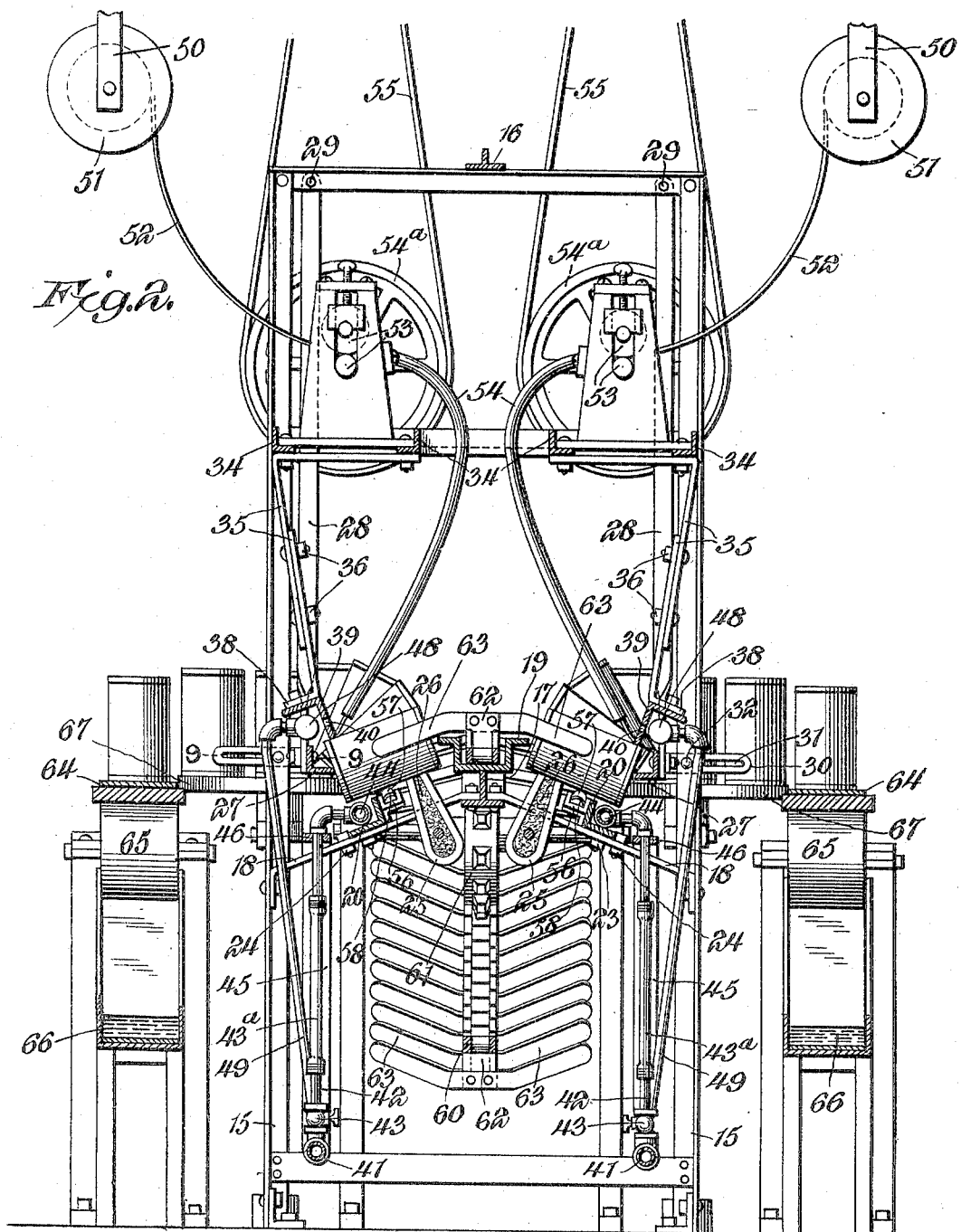

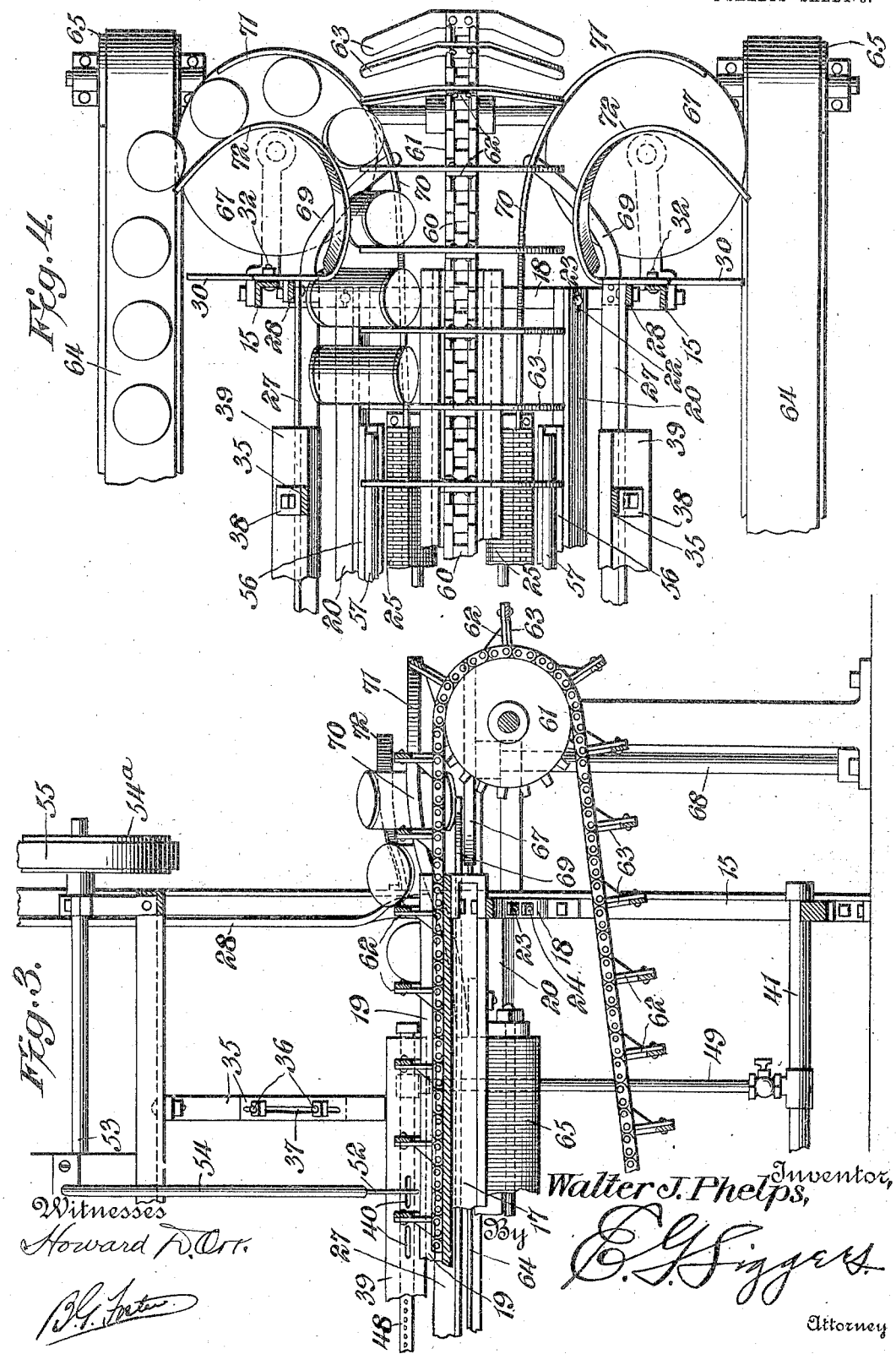

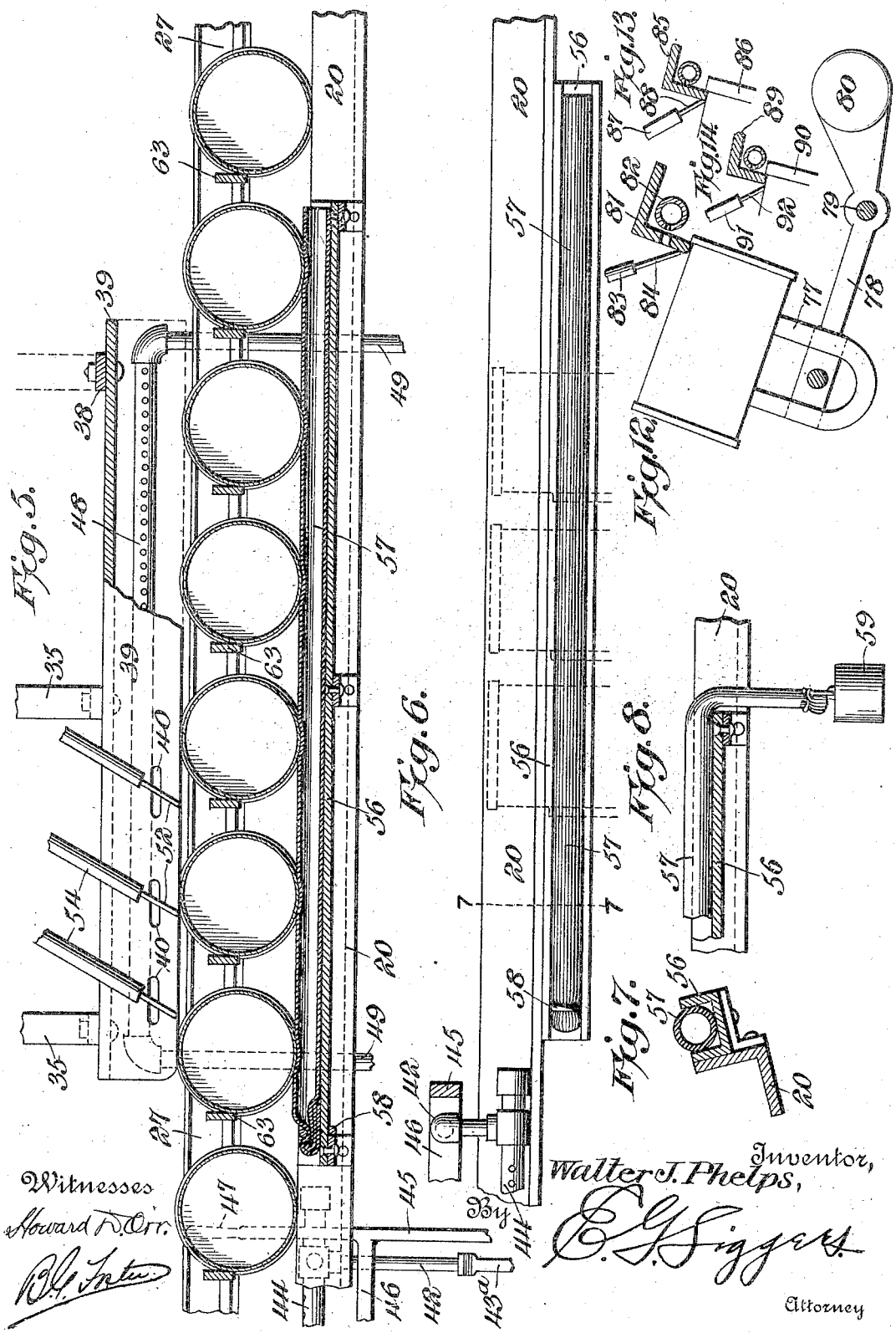

UNITED STATES PATENT OFFICE.

WALTER J. PHELPS, OF BALTIMORE, MARYLAND, ASSIGNOR TO AMERICAN CAN COMPANY, OF NEW YORK, N. Y., A CORPORATION OF NEW JERSEY.

MEANS FOR SOLDERING THE END SEAMS OF CANS.

947,935.  Specification of Letters Patent.  Patented Feb. 1, 1910.

Application filed May 22, 1908. Serial No. 434,345.

*To all whom it may concern:*

Be it known that I, WALTER J. PHELPS, a citizen of the United States, residing at Baltimore, in the State of Maryland, have invented a new and useful Means for Soldering the End Seams of Cans, of which the following is a specification.

This invention relates to mechanism for soldering the end seams of sheet metal cans, and the primary object is to provide a machine of comparatively simple structure, which is very effective in its work, and is capable of a comparatively great output.

In the automatic soldering of cans, a stationary soldering iron operating upon the upper sides of the cans is a very desirable feature, yet inasmuch as it is absolutely necessary to have the cans roll in order to secure the proper application of the solder, the use of such an iron so far as I am aware has not been practical heretofore because of the frictional resistance it offers to the rotation of the cans, and because of the fact that the cans vary slightly in diameter so that while a can of exactly the right proportions might pass beneath such an iron, one of slightly greater diameter would be stopped, and one of less would not properly coöperate with the iron.

One of the important features of this invention resides in the means which will permit the successful use of a stationary soldering iron, the rolling of the cans being insured, and each can being yieldingly maintained in coaction with the iron independently of any other can beneath the iron so that it is properly soldered.

Heretofore it has been the common practice to employ a cooling belt onto which the cans are delivered on end, and to employ a twisted chute that receives the cans and directs them onto the belt, the cans moving down the chute by gravity and being turned on end during their passage. With a machine of considerable output, this chute is likely to become clogged several times a day, and as a result the whole row of cans in the machine is blocked, creating trouble of various kinds, and sometimes burning and spoiling the cans.

Another feature of the present invention is to provide positive mechanical means which will effectively and positively remove the cans, eliminating their uncertain action by gravity as heretofore, and depositing them properly on the cooling belt.

A further feature of the invention is the provision of a double machine in which the opposite end seams of cans can be simultaneously soldered, the mechanism being so arranged that both ends of each can can be operated on in the same machine.

Another feature resides in the means for moving the can-heating mechanism out of associated relation with the cans, if the machine is stopped for any cause, thus eliminating the danger of burning such cans, and still another feature relates to the provision of mechanism that is readily adjustable in order that cans of different sizes may be operated upon.

The preferred embodiment of the invention is illustrated in the accompanying drawings, wherein:—

Figure 1 is a side elevation of the machine. Fig. 2 is a vertical cross sectional view therethrough on the line 2—2 of Fig. 1. Fig. 3 is a vertical longitudinal sectional view through the delivery end of the machine. Fig. 4 is a top plan view of said end. Fig. 5 is a longitudinal sectional view through one side of the machine at the soldering mechanism. Fig. 6 is a plan view showing the yielding track section. Fig. 7 is a cross sectional view on the line 7—7 of Fig. 6. Fig. 8 is a detail sectional view showing a slightly modified form of construction of the track section. Fig. 9 is a horizontal sectional view on the line 9—9 of Fig. 2. Fig. 10 is a detail perspective view showing the adjustable support for one of the track rails. Fig. 11 is a detail sectional view showing a slightly modified form of the construction. Fig. 12 is a similar view of still another embodiment of the invention. Figs. 13 and 14 are detail sectional views illustrating different ways in which the solder may be applied.

Similar reference numerals designate corresponding parts in all the figures of the drawings.

In the embodiment illustrated, a suitable supporting frame is employed consisting of standards 15 connected at their tops by longitudinal bars 16 and having a central longitudinally disposed bar 17 connected to the standards by braces 18. The central bar 17 supports a channel bar 19, and on opposite sides of said channel bar, are longitudinally disposed track rails 20 preferably formed of angle iron resting on the braces 18. Said braces and rails are provided respectively with slots 21 and 22 through which are passed holding bolts 23. An adjusting and holding bolt 24 is also passed through each of the brace slots 21, as shown in Fig. 10. Consequently it will be noted that the rails can be adjusted in and out, as desired, the slots 22 permitting the longitudinal expansion and contraction of the rails 20 accordingly as they are heated or cool off. Inner rails, located between the rails 20 and the channel 19, are also provided, and in the embodiment shown, these rails consist of horse-shoe magnets 25 secured side by side, and separated by sheets of asbestos 26, or other suitable material. The inner and outer rails thus produce tracks or runways for the cans on opposite sides of the channel bar 19, said tracks or runways being preferably disposed at transverse inclination, as shown in Fig. 2. No broad claims are made in this case to this structure as the same are contained in copending application, Serial No. 422,481, filed March 21, 1908. In order to prevent the cans sliding from the tracks, other rails 27 preferably of angle iron are arranged at the outer ends of the cans, and are supported from links 28 pivotally hung from their upper ends, as shown at 29. The lower ends of these links are connected to holding bars 30 disposed transversely of the standards 15 and provided with longitudinal slots 31. Bolts 32 pass through the standards and slots, and serve to hold the rails 27 in adjusted relation, as will be evident.

The cans are delivered into one end of the machine by suitable chutes 33, and arranged at the other end of the machine are soldering mechanisms, one mechanism being employed for each track or runway. For this purpose, the adjacent sets of standards are connected by longitudinal bars 34, from which are hung brackets consisting of slidably associated sections 35 connected by bolts 36 that pass through slots 37 in said sections. These brackets have outturned lower ends 38, to which are bolted or otherwise secured soldering irons in the form of angle bars 39, the depending flanges of said bars being preferably provided with longitudinally disposed slots 40. By this arrangement, it will be evident that the said soldering irons can be raised and lowered to any position desired, and when adjusted, they can be fixed against movement, said soldering irons being disposed above the tracks or runways.

For the purpose of heating the cans prior to their passage beneath the soldering irons, suitable gas supply pipes 41 are employed having upstanding branches 42 provided with valves 43. In the present form of construction, these branches 42 include flexible sections 43ª connected at their upper ends to burners 44, which, as shown in Fig. 2, are disposed longitudinally of the rails 20, and are arranged in the channels formed by the flanges of said rails. The burner pipes 44 are movable into and out of said channels, and may be moved by any suitable means. Thus in the present embodiment, they are supported on swinging links 45 connected by longitudinal bars 46, one of the links 45 being extended to form a lever 47. Thus by swinging the lever, the burners may be swung away from or toward the tracks, and thus out of and into coaction with the inner ends of the cans, as will be evident by reference to Fig. 2. The burners above mentioned, however, terminate at the soldering irons, and in order to heat said irons, other burners 48 are employed that are located in the channel bars 39, forming said irons, these burners 48 being supplied with fuel through pipes 49 connected to the supply pipes 41. It will be observed by reference to Fig. 2 that the burners 48 are located on the outer sides of the irons, and the flames directed against said irons can pass through the slots 40 and beneath the irons.

Any suitable or well known means may be employed for feeding the solder. Thus in the present embodiment, supports 50 are employed, on which spools 51 of solder are rotatably mounted. The solder is in the form of wires 52, which pass between suitable feed rolls 53, and is directed into guide tubes 54. These tubes extend to points adjacent to the inner sides of the soldering irons, and preferably direct the solder thereagainst. The feed rolls 53 are connected to pulleys 54ª around which pass belts 55 driven from any suitable source of power.

As will be apparent by reference to Figs. 2 and 5, the outer ends of the cans rotate beneath and against the soldering irons, and in order to secure their proper engagement with said irons, they are yieldingly supported during their passage beneath the same. Many different devices may be employed for this purpose. A form of mechanism, however that has proven entirely satisfactory is that disclosed in Figs. 5, 6 and 7. Secured to the inner sides of the tracks 20 beneath the soldering irons, are channel bars 56 in which are located yielding track sections in the form of rubber tubes 57, that are loosely laid in the channels of the irons 56, and are each secured at one end only, as shown at 58. These tubes project above the edges of the tracks on which the cans roll, and consequently support the cans, as illustrated in Fig. 5, and yieldingly hold them against the bottom edges of the irons, wrapping partially about the cans and frictionally engaging said cans with sufficient force to insure their rolling action, as will be evident. The tube being loose, can expand and contract, as cans pass thereover, but in order to prevent the tubes disengaging from the channels, a weight 59 may be employed as shown in Fig. 8 secured to the free end of each tube, and thus hold the same in proper relation. As the cans move along the tube a wave, as it may be called, of the yielding material will be caused thereon in advance of each can. It is necessary that this "wave" shall pass off, otherwise the tube would become bunched at the outlet end and impede the passage of the can. By leaving the tube free at the ends I permit this wave to pass off at the free end of the tube and thus prevent this bunching.

For the purpose of moving the cans along the tracks or runways, an endless carrier belt is employed in the form of a sprocket chain 60, having an upper stretch that moves in the channel of the central bar 19, the said chain passing about suitable sprocket wheels 61 located at the ends of the machine. Certain of the links of the chain have outstanding fingers 62, and secured to the outer ends of these fingers are cross bars 63, which have downwardly extending terminals that extend over the tracks or runways. These cross bars are suitably spaced apart to permit the cans to be placed and revolve freely between them.

Located on opposite sides of the machine are cooling belts 64 operating over suitable supporting pulleys 65 and having their lower stretches passing through cooling baths 66. These belts are adapted to receive the soldered cans from the delivery end of the machine, as will be evident by reference to Fig. 4, but inasmuch as the cans are preferably soldered at an inclination, it is necessary to up-end the same and reverse their direction of movement.

Heretofore it has been the usual custom to employ chutes down which the cans roll by gravity, and by means of which they are directed to an upstanding position. Instead of relying on gravity for the delivery of the cans, mechanism is employed in the present embodiment for transporting them to the belts. This mechanism includes a rotary turntable 67 for each track or runway located at the delivery end thereof, and mounted on a suitable vertical shaft 68. The turntables may be revolved by any suitable mechanism. In the present embodiment, however, their peripheries are in engagement with the inner edges of the cooling belts 64, and are revolved thereby. Arranged at the end of each outermost guide rail 27 is an inwardly curved rail 69, and extending from the ends of the magnet rails, is an oppositely curved rail 70 that has a slightly upward curve also. These rails are thus convergently disposed, and meet adjacent to the inner portion of the adjacent turntable. The rail 70 is preferably continued, and curved about the edge of its turntable, as shown at 71, to form a guard, and an inner rail 72, curved upwardly, extends over the central portion of each turntable, and has its end arranged adjacent to the belt.

The operation of the machine is substantially as follows, one side only being described as the other is substantially a duplicate. The mechanism being in motion, the cans delivered by the chute 33, drop upon the track or runway and are moved by the carrier bars along the same. They are effectively held in engagement with the rails by the magnets so that their rolling is insured. As they pass along the runway, their lower ends are heated until said ends pass beneath the soldering iron. The solder being continuously fed by the mechanism disclosed, will be melted, and will be wiped by said soldering iron around the cans at the seams. During their passage, they are yieldingly held against the under side of said soldering iron by the yielding track section. At the same time, the magnet and the frictional engagement of the yielding tube with said cans, overcome any resistance to the rolling action afforded by the iron. In this connection, the yielding track section acts in the nature of a fulcrum upon which the cans swing, and the magnets constitute the power which continuously draws the same over said fulcrum to insure the proper engagement of the cans with the soldering iron. As the cans leave the soldering iron, their lower ends and under sides are supported by the convergently disposed tracks 69 and 70, while the lower portions pass beneath the inner end of the track 72. As the cans are continuously pushed forward, they are moved upwardly to an upright position, and are deposited on the turntable 57. They are guided by the outer ends of the tracks 71 and 72, and the latter moves them off from the turntable on to the belt 64, as will be evident.

It will be clear from the above that one side of the structure constitutes a complete machine in itself, but a double machine is preferably employed because of its capacity, with a common carrier for both sides, and because of the fact that cans soldered on one side of the machine can be carried by the cooling belt back to the point of beginning and then placed on the other side of the machine either by hand or other suitable mechanism for the purpose of soldering the other ends of the cans.

As an indication of how the means for yieldingly supporting the cans against the soldering iron may be modified, attention is called to Figs. 11 and 12. In the former, the soldering iron is shown at 73 with a heater 74, and the track or runway consists of a magnet or magnets 75. In this embodiment of the invention, the magnets are so related to the soldering iron 73 that the cans, one of which is shown at 76, rolling on said magnet, are held in a tilted position by the soldering iron so that their rear ends are elevated slightly from the rear pole of the magnet. The elevation of said magnet therefore attracts the rear end of the can downwardly, thus insuring the proper engagement of the end that is being soldered with the soldering iron.

In the form of construction shown in Fig. 12, magnets 77 are still employed, but these magnets are mounted on a swinging support 78 pivoted as shown at 79 and counterweighted, as illustrated at 80. The soldering iron is shown at 81 with its heater 82. The weight 80 is sufficient to hold the cans snugly against the soldering iron so that they will be in proper engagement with the same, and the magnet 77 insures the necessary rolling action of said cans. The end of the guide tube for the solder is shown at 83, and the solder wire is designated 84. In this form of construction, it will be noted that the solder is applied directly to the soldering iron, and being melted thereby, will run down to the lower edge of the iron, where it will be applied to the can. It will be noted that the solder wire is arranged at an inclination or at an acute angle to the face of the iron. Figs. 13 and 14 show, however, how this solder feed may be modified. Thus in Fig. 13 the iron is designated 85, and a portion of the can operating thereagainst, is shown at 86. The solder tube 87 in this instance, directs the solder wire 88 partially against the iron 85, and partially against the can. In Fig. 14, the soldering iron is designated 89 and the can 90. In this arrangement, the guide tube 91 directs the solder wire 92 against the can solely. Any of these devices will operate, but the arrangement shown in Figs. 2 and 12 is probably preferred, especially where the machine is run at a high rate of speed, inasmuch as the iron can be heated to a comparatively high degree and the melting of the solder insured, whereas if the solder is fed to the cans, said cans must be highly heated, and there is some danger of burning or at least discoloring them. When the solder is fed to the iron, however, the cans do not have to be highly heated.

The special advantages of my invention are as follows: The difficulty has always been found in end-seam soldering machines or floaters in causing the cans to rotate beneath or in engagement with the soldering devices. One type of machine uses rotating carriers which individually grip the can and rotate it by means of gears. This arrangement is not only complicated and expensive, but it is relatively slow, and it is giving place in the majority of machines to a chain resting upon the cans, such chain being movable and acting to increase the traction of the cans and at the same time draw them forward, thus rolling the cans. It has been found in practice, however, that the chains of this character are not certain in that operation. If they are too heavy they tend to impede any rotation of the can at all. If they should by any chance happen to be supported from the can, the can does not rotate, and if the chain is properly engaging with two comparatively larger cans, and a smaller can is interposed, the chain will be lifted free from the smaller can and as a consequence the smaller can will not rotate. These cans pass along the conveyer side by side, to a large extent frictionally contacting with each other, and, hence, one can is impeding the rotation of the other. As a consequence, the cans are liable to oscillate instead of rotate, and the solder is thus applied only over one-half of the can, the other portion of the can remaining unsoldered and the can having to be cast aside. This not only wastes time and spoils the can, but it also wastes solder. By the use of my magnetic traction I do away with the use of these chains, or any other means for increasing the adhesion of the can, and I provide means which is individual to each can for increasing its traction upon the track. This means does not impede the onward movement of the cans, but it provides for a rolling contact between the can and track and for an absolute movement of rotation of each can as the can conveyer moves along. By the use of my tractive magnets beneath the track, I positively cause each can to be rotated and by increasing the magnetic power immediately beneath the mechanism operating upon the periphery of the can, I can absolutely secure rotation even where the pressure or friction against the periphery of the can is great.

It will be seen that my means for increasing the traction does not involve any mechanism, and that it provides for a turning movement of the cam against the soldering iron, as will be hereafter referred to.

Fixed soldering irons have heretofore been deemed preferable to movable soldering irons, but they have not been used practically, because the track on which the cans roll has been rigid, and, therefore, no allowance could be made for variations in the sizes of the cans. These variations are comparatively small, but they must be taken into account, as they occur practically in every can. The iron and track with a rigid iron being relatively rigidly distanced from each other, larger cans would either not enter beneath the iron, or, having entered, would be stopped from rolling by the friction of the iron, while cans smaller in diameter would not contact with the iron at all, this either resulting in no solder being placed upon them, or because of their not being rolled, resulting in the solder being placed on one side only. Irons pivoted at one end have been suggested, but it will be obvious that, at the point of pivoting, such an iron is rigid as far as its distance from the track goes, and that, further, if at this point the iron must be raised upon the track sufficient to admit a can of at least the largest diameter, a smaller can will, therefore, escape this entrance point of the iron, and if any other portion is held up by a larger can, the smaller will escape the iron along its whole extent. The same action would occur were the iron supported on springs. The whole iron would have to yield entirely along its length and could not yield variably at various points. What is true of the rigid soldering iron, as above described, would equally well apply to a track section which should be pivoted or yieldingly held by means of springs. I obviate these faults and permit the use of a fixed soldering iron against which the cans may roll by providing a yielding track or rail on which the cans are supported, and I further use to effect my purpose, a continuously variable resilient track bed or rail surface differently yieldable at different points to different cans, and which varies at any point along its length with the variation in each can. This might be secured in some degree by using a track or rail made of small independent sections resiliently supported, but I secure this result in a simple manner by using a resilient or elastic rail surface or bed, not under tension, but presenting a face which will yield at any point and continuously from end to end, this bed being formed by using the rubber tube described. Such a bed yields to each can individually and a depression at any one point along the bed or rail surface will not affect any other portion of the bed. Further than this, the use of a yielding surface on the rail gives a hold to the can and thus secures greater tractive power and a more certain rotation of the can.

I have before stated the peculiar advantages of the magnetic traction, but in addition it has peculiar advantages with regard to the soldering iron and in itself provides for an individual yielding bed when arranged as shown in Figs. 2, 11 or 12, wherein the cans fulcrum on the rail 57 or on a separate fulcrum point. This acts to draw yieldingly downward on one end of the can and yieldingly present the other end of the can to the rigid iron, permitting all variations in the arc of movement of the can to suit the variations in the size thereof, at the same time holding the cans in contact with the edge of the soldering bar.

Heretofore, the end seams of cans have been soldered in one of three ways: first, by heating the cans and dropping solder thereon, the cans acting as their own soldering iron. The heat necessary for this burns off the tin on the cans at this point, and is also likely to discolor the cans, besides not sweating the joint, nor forcing the solder into the seam. Second, the cans may be rolled through a bath of solder. This does not make a neat job, as the solder is placed not only at the joint, but on either side of the seam and around on the end of the can. In order to avoid this, the surplus solder must be wiped off, necessitating not only an additional mechanism for this purpose, but causing a waste of solder. A still further objection to this is that, unless the can is moved easily and continuously rolled through the bath, the fluid solder is liable to agglomerate in lumps or to be thicker at one point than another, thus again wasting solder, and, in addition, destroying the looks of the can. The third way of applying solder is by using soldering irons moving with the cans. This requires a complicated mechanism for moving the iron and solder, and it does not give a wiping action of the iron against the solder, which will force it into the joint. My stationary soldering iron wipes the joint and presses the solder therein. The solder falls either against the iron, or, preferably, against the bottom edge of the iron. The can as it rolls against the bottom edge cuts off the solder, as it were, against the bottom of the iron, or, in other words, the iron, when in contact with the can, acts as a dam or wall against which the molten solder is held and along which it may be said to roll with the moving can until the next soldering point is reached.

It will be seen that by my device the solder is applied most economically. No more solder is used than is necessary and all of it is used that is supplied. The solder is used to the very best purpose, immediately at the joint, and is forced into the joint. No wiping is required. The cans do not require any high heating and the can is, therefore, not detinned, nor is the solder supplied upon the side and around the corner of the can to its own waste and to the marring of the looks of the article.

The peculiar advantages of the turntable and of the means whereby the heating jets are drawn from contact with the cans, if by any chance clogging should occur, have before been stated, and, therefore, require no other description. It will be seen, then, that I have devised a construction in which the cans are positively carried along, in which they are positively rotated beneath the soldering iron, in which the solder is not wasted or spread, and in which no burning of the cans can possibly occur.

From the foregoing, it is thought that the construction, operation and many advantages of the herein described invention will be apparent to those skilled in the art, without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent, is:—

1. In mechanism of the character set forth, the combination with a track or runway along which the cans are caused to roll transversely, means for exerting a magnetic attraction beneath said track or runway to increase the adhesion of the cans thereto but not prevent the cans from rolling therealong, a fixed soldering iron arranged above the track, and means engaging with the cans to positively move them along the track or runway, said track or runway at a point below the soldering iron having a yielding section.

2. In mechanism of the character set forth, the combination of a track or runway along which the cans are caused to roll transversely, means for exerting a magnetic attraction beneath said track or runway to increase the adhesion of the cans thereto but not prevent the cans from rolling therealong, a fixed soldering iron arranged above the track, means engaging with the cans to positively move them along the track or runway, said track or runway at a point below the soldering iron having a yielding section composed of a hollow tube.

3. In mechanism of the character set forth, the combination with a fixed soldering iron held against movement in any direction, of means for rolling cans along said soldering iron in contact therewith, and means acting on the cans and variably yielding for each can for maintaining each can independently of the others in engagement with said soldering iron.

4. In mechanism of the character set forth, the combination of a track or runway along which the cans are caused to roll transversely, means for exerting a magnetic attraction beneath said track or runway to increase the adhesion of the cans thereto but not prevent the cans from rolling therealong, a fixed soldering iron arranged above the track, means engaging with the cans to positively move them along the track or runway, said track or runway at a point below the soldering iron having a yielding section composed of a hollow tube open at one end.

5. In mechanism of the character set forth, the combination of a track or runway along which the cans are caused to roll transversely, means for exerting a magnetic attraction beneath the track or runway to increase the adhesion of the cans thereto but not prevent the cans from rolling therealong, a fixed soldering iron arranged above the track, means engaging with the cans to positively move them along the track or runway, said track or runway comprising a channel bar with a hollow tube located therein and projecting above the same.

6. In mechanism of the character set forth, the combination with a fixed soldering iron held against vertical movement, of means located on one side of the same for heating it, means for feeding solder to the opposite side, and means for rolling the cans along and yieldingly maintaining them in engagement with the under side of said iron.

7. In mechanism of the character set forth, the combination with a fixed soldering iron held against vertical movement, of means located on one side of the frame for heating it, means for feeding wire solder against the opposite side of said soldering iron, a runway for the cans and means for rolling the cans along said runway with the end seams thereof beneath and in rubbing contact with said soldering iron to cause the same to sweat the solder into the seam, substantially as specified.

8. In mechanism of the character set forth, the combination with a fixed soldering iron, and means for heating the iron and feeding solder thereto, of a bed or runway adapted to carry cans transversely thereon, said bed being variably yieldable along its whole extent beneath the soldering iron, and means for rolling cans along said bed and beneath the iron.

9. In mechanism of the character described, a yielding track section adapted to carry cans transversely, means for rolling the cans along the track, an overhead soldering iron beneath which the cans roll and against which they engage, means for directing heat against one face of the iron, and means for directing solder against the other face of the iron.

10. In mechanism of the character set forth, the combination with a soldering iron comprising a bar, of a burner located on one side of the bar for heating the same, means for applying solder to the opposite side of the bar, means for holding the bar stationary, and means for rolling cans against the under side of the bar and yieldingly maintaining them in engagement with the same.

11. In mechanism of the character set forth, the combination with a soldering iron, of means for holding the same immovable in different adjusted positions, and means for rolling cans against and yieldingly holding them in engagement with the iron.

12. In mechanism of the character set forth, the combination with a soldering iron, of vertically adjustable brackets connected thereto for holding said soldering iron immovable in different positions, and means for rolling cans against and yieldingly holding the same in engagement with the under side of the iron.

13. In mechanism of the character set forth, the combination with a soldering iron held against vertical movement, of a runway for cans having a section thereof beneath the soldering iron adapted to yieldingly hold each can against the soldering iron independently of its action on any other can, and means for rolling the cans along said runway with the end seams thereof beneath and in rubbing contact with said soldering iron, substantially as specified.

14. In mechanism of the character set forth, the combination with a soldering iron, of a runway for cans having a portion below the soldering iron constructed with a tubular section of yielding material against which the cans roll and which yieldingly holds the cans in rubbing contact with said soldering iron to cause the same to sweat the solder into the seam, substantially as specified.

15. In mechanism of the character set forth, the combination with a soldering iron, of a runway for the cans including a section of yielding material against which the cans roll and which yieldingly holds the cans with the seams thereof in rubbing contact with said soldering iron, and a support for said yielding section having a channel in which said yielding section is loosely carried so as to allow the tube to expand itself under the compression of the cans, substantially as specified.

16. In mechanism of the character set forth, the combination with soldering mechanism, of a track or runway for cans including a channeled support located adjacent to the soldering mechanism, and a tubular track section arranged in the channel and secured at one end therein, said section yieldingly holding the cans against the soldering mechanism.

17. In mechanism of the character set forth, the combination with a soldering iron, of a track or runway for cans including a yielding portion extending beneath the iron for yieldingly holding the cans against said iron.

18. In mechanism of the character set forth, the combination with a stationary soldering iron, of a track or runway for the cans including a yielding section located below said soldering iron and constituting means for yieldingly holding the cans against the under side of the soldering iron during their passage by the same.

19. In mechanism of the character set forth, the combination with a stationary soldering iron, of a track or runway for the cans including a yielding section located below said soldering iron and constituting means for yieldingly holding the cans against the under side of the soldering iron during their passage by the same, means for heating the cans prior to their movement into coaction with the soldering iron, and means for heating said iron.

20. In mechanism of the character set forth, the combination with a track or runway for cans including a channeled supporting section, a yielding tubular track located therein, a stationary soldering iron located above the track, means for heating the cans passing over said track or runway prior to their engagement with the soldering iron, and means for heating said soldering iron.

21. In mechanism of the character set forth, the combination with a longitudinally extended fixed soldering iron adapted to act on several cans at the same time, a track or runway along which the cans roll transversely beneath the iron, and means acting on each can individually and independently for securing the rotation of the cans and yieldingly forcing the cans into contact with the fixed iron.

22. In mechanism of the character set forth, the combination with a stationary soldering iron, of means for rolling and yieldingly holding cans against the soldering iron, said means including a magnet that operates upon the cans.

23. In mechanism of the character set forth, the combination with a soldering iron, of means for rolling and yieldingly holding cans against the iron, said means including a track along which the cans roll, and magnetic means for causing the cans to turn upon said track as a fulcrum.

24. In mechanism of the character described, a fixed, longitudinally extending soldering iron, a rail beneath but at one side of said iron, means for rolling the middle portion of a can over said rail, and means for depressing one end of the can to lift the other against the iron.

25. In mechanism of the character described, a fixed soldering iron, a rail beneath but at one side of said iron, means for rolling the middle portion of a can on said rail, and means continuously acting along the whole extent of the iron for depressing one end of the can and lifting the other against the iron.

26. In mechanism of the class described, a fixed longitudinally extending soldering iron, a rail beneath but at one side of said iron, means for rolling the middle portion of a can over said rail, and means acting on each can individually and independently of every other can beneath the whole extent of the iron to depress one end and elevate the other end of the can, said means being independently variable in correspondence with any one can at any one point.

27. In mechanism of the character set forth, the combination with a soldering iron, of means for rolling and yieldingly holding cans against the iron, said means including a yielding track section along which the cans roll, and magnetic means associated with said track section for causing the cans to turn thereupon as a fulcrum.

28. In mechanism of the character set forth, the combination with a stationary soldering iron, of a track section located below the same and comprising a yielding tube upon which the cans roll and which yieldingly maintains the cans against the under side of the iron, and magnetic means associated with said tubular track for holding the cans thereagainst.

29. In mechanism of the character set forth, the combination with a frame, of a track or runway mounted thereon and including a yielding section over which cans roll, magnetic means for holding the cans against the track or runway to insure their rotation, a stationary soldering iron located above the yielding portion of the track, means for heating the cans prior to their engagement with the iron, means for heating said iron, means for feeding solder to the iron, and means for moving the cans along the track or runway.

30. In mechanism of the character set forth, the combination with a plurality of tracks or runways, of soldering mechanism associated with each, and means for moving the cans along the tracks or runways, said means including a carrier movable between the same, and oppositely extending can-engaging cross bars mounted on the carrier and projecting beyond opposite sides of the same over the tracks or runways.

31. In mechanism of the character set forth, the combination with a plurality of tracks or runways, of soldering mechanism associated with each, and means for moving the cans along both tracks or runways, said means including an endless carrier chain, and oppositely extending can-engaging cross bars mounted on the chain and extending on opposite sides of the same over the tracks or runways.

32. In mechanism of the character set forth, the combination with a plurality of tracks or runways located side by side, of soldering mechanism associated with each track or runway and located at the same end of the machine, a channel located between the tracks or runways, an endless chain having one stretch operating in the channel, and oppositely extending can-engaging cross bars secured to the chain and projecting on opposite sides of the channel over the track or runway.

33. In mechanism of the character described, a track or runway adapted to carry cans transversely and along which they shall roll, means for moving the cans along said track or runway, a stationary soldering iron associated with the track or runway, and means for increasing the adhesion between the cans and said track beneath the soldering iron.

34. In mechanism of the character set forth, the combination with a runway for the cans along which the cans roll, of a soldering iron above said runway, an endless conveyer moving along said runway and having blades contacting with the peripheries of the cans to roll the cans along the runway in rubbing contact with said soldering iron, guides for upending the cans at the end of the runway, a turn table associated with said guides and above which the cans are deposited and a cooling conveyer upon which said turn table deposits the cans, substantially as specified.

35. In mechanism of the character set forth, the combination with laterally-separated parallel conveyers moving in opposite directions, of a flat turntable located at the adjacent ends of but between the two conveyers and delivering material from one conveyer to the other, and transverse fixed guide rails crossing the face of the turntable.

36. In mechanism of the character set forth, the combination with soldering mechanism, of a conveyer moving to and past the same, a laterally-separated conveyer for the soldered cans moving in opposite directions to the first-named conveyer, and a flat turntable located at the ends of but between the two conveyers receiving the soldered cans and delivering the same to the second conveyer, and means for up-ending the cans as they are deposited on the turntable.

37. In mechanism of the character set forth, the combination with a track or runway, of soldering mechanism associated therewith, a turntable located at the end of the track or runway, means interposed between the track or runway and the turntable for up-ending the cans on to the turntable as they are delivered from the track or runway, and guides supported above the turntable and transverse thereto for directing the can therefrom.

38. In mechanism of the character set forth, the combination with a track or runway, of soldering mechanism associated therewith, a rotary turntable located at the end of the track or runway, and convergently disposed supporting rails located at the end of the track or runway and having their convergent ends extending over the turntable, said rails constituting means for up-ending on to the turntable the cans delivered from the track or runway.

39. In mechanism of the character set forth, the combination with a track or runway, of soldering mechanism associated therewith, a rotary turntable located at the end of the track or runway, convergently disposed supporting rails located at the end of the track or runway and having their convergent ends associated with the outer side of the turntable, and another rail located at the end of the track or runway and associated with the inner portion of the turntable.

40. In mechanism of the character set forth, the combination with a track or runway, of soldering mechanism associated therewith, a cooling belt, a rotary turntable located alongside the cooling belt and disposed at one end of the track or runway, and rails located at the end of the track or runway and extending over the turntable for up-ending the cans from said track or runway on to the turntable, certain of said rails constituting means for delivering the cans from the turntable on to the cooling belt.

41. In mechanism of the character set forth, the combination with a track or runway including a yielding portion, of a soldering iron located over the yielding portion, means for heating the cans prior to their movement into coaction with the soldering iron, means for moving the cans along the track or runway, a cooling belt, a rotary turntable driven with the cooling belt, and located alongside the same, said turntable being located at the end of the track or runway, and means for up-ending the cans that are delivered from the track or runway on to the turntable.

42. In mechanism of the character set forth, the combination with a supporting frame, of a soldering iron, means for adjustably supporting the soldering iron and holding it fixed in its adjusted position, a track or runway for the cans comprising relatively adjustable rails mounted on the supporting frame, means for rolling cans along the track or runway, and means for holding each can individually into yielding contact with the soldering iron independent of any other can passing thereunder.

43. In mechanism of the character set forth, the combination with a track or runway for the cans adapted to support cans transversely and allow them to roll therealong, of soldering mechanism associated with the same, means associated with the track or runway in advance of the soldering mechanism for heating the cans prior to their arrival at the soldering mechanism, and means for moving the heating means into and out of coaction with the cans.

44. In mechanism of the character set forth, the combination with a track or runway for the cans adapted to support the cans transversely and allow the same to roll therealong, of soldering mechanism associated with the same, burners located in advance of the soldering mechanism and movably associated with the track or runway for heating the cans rolling thereover, and a lever connected to the burners for moving them into and out of coaction with the cans.

45. In mechanism of the character set forth, the combination with a supporting frame, of a track or runway including a yielding portion, a soldering iron located above the said yielding portion, means for rolling the cans along the track or runway, magnetic mechanism for holding the cans against said track or runway for insuring their rolling action, means for heating the cans, means for heating the soldering iron, means for feeding solder to said soldering iron, a rotary turntable located at the end of the track or runway, a cooling belt extending alongside the turntable, and rails located at the end of the track or runway and associated with the turntable for up-ending soldered cans as they pass from the track or runway on to the turntable.

46. In can soldering mechanism, a track adapted to support cans transversely and allow them to roll therealong, a conveyer movable along the track and having fingers projecting out laterally therefrom, and engaging with the cans, and magnetic means located beneath the track for increasing the tractive contact between the can and the track.

47. In can soldering mechanism, a track adapted to support cans transversely and allow them to roll therealong, a soldering iron supported above the track in such position as to contact with the ends of the cans, a continuous conveyer movable along the track and having fingers projecting out laterally therefrom to engage the sides of the cans, and magnetic means located beneath the track for increasing the tractive contact between the can and the track and insuring the rolling of the cans.

48. In can soldering mechanism, a fixed soldering iron, a support extending beneath the soldering iron but to one side thereof and adapted to engage with the middle portion of a can and form a fulcrum on which the can may turn, means for moving the can beneath the soldering iron and over said support, and magnetic means for drawing down upon the end of the can away from said iron and thereby forcing the other end of the can into contact with the iron.

49. In a can soldering mechanism, a fixed soldering iron, a tubular resilient track supported parallel to the fixed soldering iron but to one side thereof, means for moving a series of cans longitudinally along the tubular track and beneath the soldering iron, and magnetic means at one side of said tubular track for drawing down upon the end of the can opposed to the soldering iron and forcing the other end of said can into contact with the soldering iron.

50. In mechanism of the class described, the combination with a track or runway along which the cans roll, of a fixed soldering iron supported above the track or runway and adapted for rubbing contact with the periphery of each can as it rolls along the runway, means for feeding and projecting solder in the form of a wire against the face of the iron at an angle thereto, and means for heating the iron, substantially as specified.

51. In mechanism of the class described, the combination with a track or runway along which the cans roll, of a fixed soldering iron consisting of a longitudinally extended plate have an edge against which the cans rolling on the runway have a rubbing or sweating contact, means for feeding and projecting solid solder against the face of the iron and contiguous to the lower edge of the iron, which is in contact with the cans, whereby the passage of the cans serves to cut off the supply of solder against said edge of the iron, and means for heating the iron, substantially as specified.

52. In mechanism of the character set forth, the combination with a track or runway along which the cans roll transversely, of a soldering iron arranged over the track or runway, and consisting of a longitudinally extended plate having an edge against which the cans rub as they roll along the runway, means for holding the iron against movement in any direction, means at one side of the plate for heating the same, and means for directing solid solder against the face of the said plate at the other side thereof, adjacent to the said edge, and at an acute angle thereto, whereby the iron when in contact with a can acts as a dam or wall against which the molten solder is held while the can rolls, substantially as specified.

53. In mechanism of the class described, the combination with a track or runway adapted to support cans transversely and allow them to roll therealong, of a fixed soldering iron supported above the track or runway and adapted to engage with the peripheries of the cans as they roll beneath the same, means located at one side of the can for heating the iron, tubular guides suspended above the iron and directed toward the lower edge of the same and onto the opposite side of the iron from said heating means, and means for feeding solder into said tubular guides and against the iron.

54. In mechanism of the character set forth, a soldering iron having the shape of a right angle in cross section and arranged in a substantially horizontal position, in combination with means for heating the iron, said means being arranged within an angle of the iron, one flange of the iron constituting an edge for the cans to roll against with a rubbing contact, and the other flange forming a shield between the heating means and the solder directing means, and means for directing solder against the exterior face of the iron, substantially as specified.

55. In a can soldering machine, a soldering iron made angular in cross section, in combination with a heating tube arranged within the angle of the iron so as to project the heat against the inside face of the iron, means for projecting solid solder against the outside face of the iron above its lower edge, said means being deposed at an inclination so as to bring the end of the solder directly against the iron to cause the iron to fuse the solder, and means for conveying the cans along the soldering iron and rotating them with the seams thereof in rubbing or sweating contact with said iron, substantially as specified.

56. In combination with a soldering iron consisting of a longitudinally extended plate having a relatively horizontal downwardly extended portion, and a laterally extended flange, of means for directing solder against the outer face of the downwardly extended portion and above its lower edge, means located in rear of said plate and beneath the lateral flange thereof for directing the heat against the inner face of said downwardly extended portion, and means for rolling cans beneath the said lower edge of the iron with the seams thereof, in rubbing or sweating contact therewith, substantially as specified.

57. In mechanism of the character set forth, the combination with a soldering iron, of vertically adjustable brackets connected thereto for holding said soldering iron immovable in different positions, and means for rolling cans against and yieldingly holding the same in engagement with the under side of the iron, substantially as specified.

58. In an end seam soldering machine, the combination with a can runway, of a fixed soldering iron above the runway against which the rolling cans have a sliding or rubbing contact to sweat the solder into the seam, means for feeding wire solder against said soldering iron, means for heating the soldering iron, said soldering iron serving to fuse the solder, substantially as specified.

59. In an end seam soldering machine, the combination with a can runway, of a fixed soldering iron above the runway against which the rolling cans have a sliding or rubbing contact to sweat the solder into the seam, means for feeding wire solder against said soldering iron, means for heating the soldering iron, said soldering iron serving to fuse the solder, said runway having a magnet rail to increase the adhesion of the cans thereto and insure their rolling movement thereon, and their sliding or rubbing movement against the soldering iron, substantially as specified.

60. In an end seam soldering machine, the combination with a can runway, of a fixed soldering iron above the runway against which the rolling cans have a sliding or rubbing contact to sweat the solder into the seam, means for feeding wire solder against said soldering iron, means for heating the soldering iron, said soldering iron serving to fuse the solder, said runway having a magnet rail to increase the adhesion of the cans thereto and insure their rolling movement thereon and their sliding or rubbing movement against the soldering iron, said runway having an elastic or yielding rail to insure the rolling cans being each individually maintained in contact with the soldering iron, substantially as specified.

61. In an end seam soldering machine, the combination with a can runway, of a fixed soldering iron above the runway against which the rolling cans have a sliding or rubbing contact to sweat the solder into the seam, means for feeding wire solder against said soldering iron, means for heating the soldering iron, said soldering iron serving to fuse the solder, said runway having a magnet rail to increase the adhesion of the cans thereto and insure their rolling movement thereon and their sliding or rubbing movement against the soldering iron, said runway having an elastic or yielding rail to insure the rolling cans being each individually maintained in contact with the soldering iron, said yielding rail serving also as a fulcrum over which the cans may each individually tilt downward at one end and upward at the other end against said soldering iron to further insure proper contact of each can individually with the soldering iron, substantially as specified.

62. In a can end soldering machine, the combination with a can runway, of a soldering iron above the runway against which the rolling cans have a sliding or rubbing contact to sweat the solder into the seams, a conveyer for propelling the cans along the runway, and a wire solder feed for projecting solder against the soldering iron, substantially as specified.

63. In a can end soldering machine, the combination with a can runway, of a soldering iron above the runway against which the rolling cans have a rubbing or sliding contact to sweat the solder into the seams, said runway having a magnet rail to increase the adhesion of the cans thereto and insure their rolling, substantially as specified.

64. In a can end soldering machine, the combination with a can runway, of a soldering iron above the runway against which the rolling cans have a rubbing or sliding contact to sweat the solder into the seams, said runway having a yielding rail section to cause the rolling cans to individually contact with the soldering iron, substantially as specified.

65. In a can end soldering machine, the combination with a can runway, of a soldering iron above the runway against which the rolling cans have a rubbing or sliding contact to sweat the solder into the seams, said runway having a rail over which the cans may tilt as a fulcrum downward at one end and upward at the other end against the soldering iron above to cause the cans to individually contact with said soldering iron, substantially as specified.

66. In a can end soldering machine, the combination with a can runway, of a soldering iron above the runway against which the rolling cans have a rubbing or sliding contact to sweat the solder into the seams, said runway having a magnet rail to increase the adhesion of the cans thereto and insure their rolling, a wire solder feed for projecting solder against the soldering iron, substantially as specified.

67. In a can end soldering machine, the combination with a can runway, of a soldering iron above the runway against which the rolling cans have a rubbing or sliding contact to sweat the solder into the seams, said runway having a yielding rail section to cause the rolling cans to individually contact with the soldering iron, and a wire solder feed for projecting solder against the soldering iron, substantially as specified.

68. In a can end soldering machine, the combination with a can runway, of a soldering iron above the runway against which the rolling cans have a rubbing or sliding contact to sweat the solder into the seams, said runway having a rail over which the cans may tilt as a fulcrum downward at one end and upward at the other end against the soldering iron above to cause the cans to individually contact with said soldering iron, and a wire solder feed for projecting solder against the soldering iron, substantially as specified.

69. In a can end soldering machine, the combination with a can runway, of a soldering iron above the runway against which the rolling cans have a rubbing or sliding contact to sweat the solder into the seams, said runway having a magnet rail to increase the adhesion of the cans thereto and insure their rolling, and means for rolling the cans along said runway, substantially as specified.

70. In a can end soldering machine, the combination with a can runway, of a soldering iron above the runway against which the rolling cans have a rubbing or sliding contact to sweat the solder into the seams, said runway having a yielding rail section to cause the rolling cans to individually contact with the soldering iron, and means for rolling the cans along said runway, substantially as specified.

71. In a can end soldering machine, the combination with a can runway, of a soldering iron above the runway against which the rolling cans have a rubbing or sliding contact to sweat the solder into the seams, said runway having a rail over which the cans may tilt as a fulcrum downward at one end and upward at the other end against the soldering iron above to cause the cans to individually contact with said soldering iron, and means for rolling the cans along said runway, substantially as specified.

72. In a can end soldering machine, the combination with a can runway, of means for rolling the cans along the runway, a soldering iron above the runway and against which the rolling cans have a sliding or rubbing contact to sweat the solder into the seams, a heater for the soldering iron and a wire solder feed device for directing solder against said soldering iron, substantially as specified.

73. In a can end soldering machine, the combination with a can runway, of means for rolling the cans along the runway, a soldering iron above the runway and against which the rolling cans have a sliding or rubbing contact to sweat the solder into the seams, a heater for the soldering iron and a wire solder feed device for directing solder against said soldering iron, said runway having a magnet rail to increase the adhesion of the cans thereto and insure their rolling, substantially as specified.

74. In a can end soldering machine, the combination with a can runway, of means for rolling the cans along the runway, a soldering iron above the runway and against which the rolling cans have a sliding or rubbing contact to sweat the solder into the seams, a heater for the soldering iron and a wire solder feed device for directing solder against said soldering iron, said runway having an elastic rail section under said soldering iron to cause the cans to individually contact therewith, substantially as specified.

75. In a can end soldering machine, the combination with a can runway, of means for rolling the cans along the runway, a soldering iron above the runway and against which the rolling cans have a sliding or rubbing contact to sweat the solder into the seams, a heater for the soldering iron and a wire solder feed device for directing solder against said soldering iron, said runway having a rail under said soldering iron over which each can may individually tilt as a fulcrum downward at one end and upward at the other end against the soldering iron above to insure the contacting of each can continuously with the soldering iron as it rolls along the runway, substantially as specified.

76. The combination of a can runway upon and along which the cans roll, with a soldering iron under and against which the cans rub or slide to sweat the solder into the seam, and a solder feed for supplying solder to the cans rolling along the runway under the soldering iron, substantially as specified.

77. The combination of a can runway upon and along which the cans roll, with a soldering iron under and against which the cans rub or slide to sweat the solder into the seam, and a wire solder feed for supplying solder to the cans rolling along the runway under the soldering iron, substantially as specified.

78. The combination of a can runway upon and along which the cans roll, with a soldering iron under and against which the cans rub or slide to sweat the solder into the seam, a wire solder feed for supplying solder to the cans rolling along the runway under the soldering iron, and a heater for the soldering iron, substantially as specified.

79. The combination of a can runway upon and along which the cans roll, with a soldering iron under and against which the cans rub or slide to sweat the solder into the seam, and a solder feed for supplying solder to the cans rolling along the runway under the soldering iron, said runway having a rail over which each can may individually tilt as a fulcrum downward at one end and upward at the other against the soldering iron, substantially as specified.

80. The combination of a can runway upon and along which the cans roll, with a soldering iron under and against which the cans rub or slide to sweat the solder into the seam, and a solder feed for supplying solder to the cans rolling along the runway under the soldering iron, said runway having a rubber tube rail to insure the rolling of the cans upon and along the runway and the contacting of the cans individually with the soldering iron, substantially as specified.

81. The combination of a can runway upon and along which the cans roll, with a soldering iron under and against which the cans rub or slide to sweat the solder into the seam, and a solder feed for supplying solder to the cans rolling along the runway under the soldering iron, said runway having a magnet rail to increase the adhesion of the cans thereto and insure their rolling, substantially as specified.

In testimony, that I claim the foregoing as my own, I have hereto affixed my signature in the presence of two witnesses.

WALTER J. PHELPS.

Witnesses:
B. G. FOSTER,
JOHN H. SIGGERS.